Sept. 30, 1952 T. M. COLE 2,612,283
CONVERTIBLE FLUSH AND SURFACE MOUNTABLE PANEL BOARD BOX
Filed Oct. 7, 1949
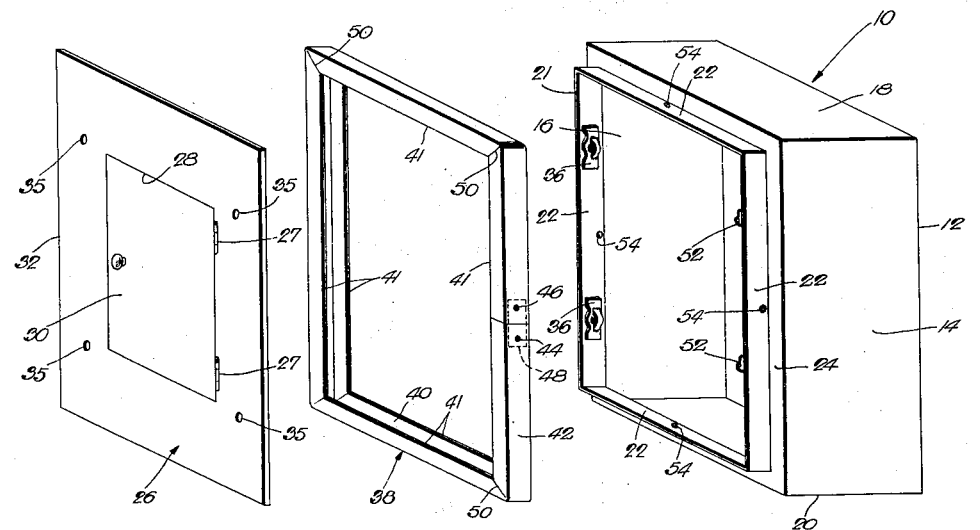
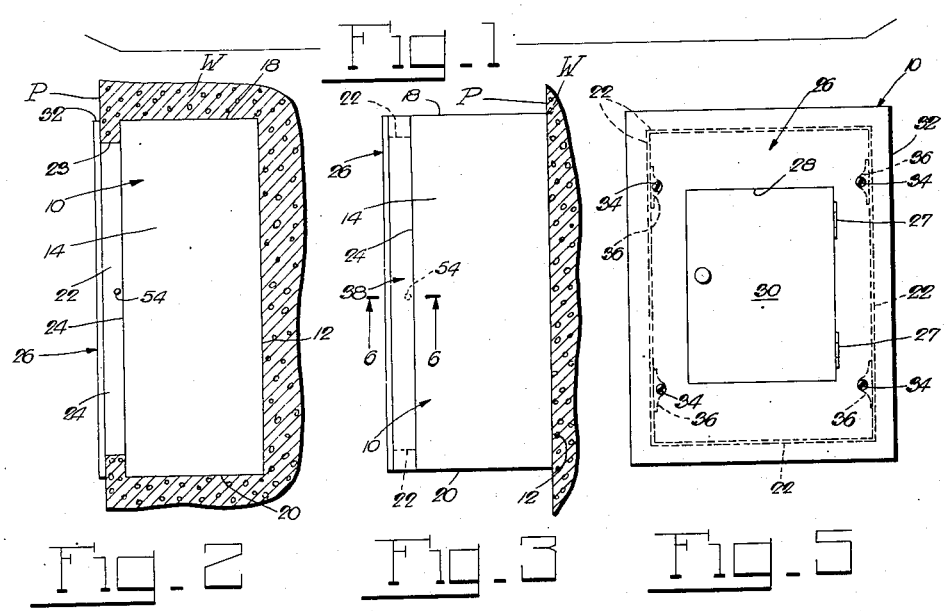
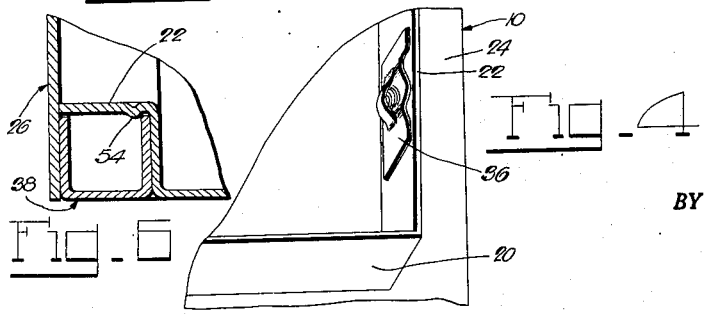
INVENTOR.
THOMAS M. COLE
BY Edwin Levinson +
Harry Cole
ATTORNEYS.

Patented Sept. 30, 1952

2,612,283

UNITED STATES PATENT OFFICE 2,612,283

CONVERTIBLE FLUSH AND SURFACE MOUNTABLE PANEL BOARD BOX

Thomas M. Cole, New York, N. Y., assignor to Federal Electric Products Company, Newark, N. J., a corporation Application October 7, 1949, Serial No. 120,122

2 Claims. (Cl. 220—3.6)

The present invention relates to panelboard boxes or enclosures for electrical devices such as, for example but without limitation, switches, circuit breakers, fuse blocks, etc.

The primary object of the present invention is the provision of a panelboard box which is well adapted to be used in a flush mounting and which by the provision of a simple and unitary auxiliary device can be easily converted to a panelboard box which is well adapted for the surface mounting thereof.

Another object of the invention is to provide, in conjunction with a panelboard box of suitable construction, an auxiliary device which is of such construction and which is so related to the construction of the box as to obviate the need for separate fastening means for operatively associating said auxiliary device with said box.

More particularly, pursuant to the objects of the present invention, the box and the auxiliary device are so constructed in relation to each other and the auxiliary device is of such construction that the latter may be positioned as a unit on the box and held in position automatically by the securement of the cover part of the box to the body part thereof.

The above and other features, objects and advantages will become apparent when referring to the accompanying specification, drawings and claims.

In the drawings:

Fig. 1 is an exploded perspective view of a panelboard box embodying the present invention;

Fig. 2 is a side elevation view of the box in a flush mounted position;

Fig. 3 is a side view of the box in a surface mounted position;

Fig. 4 is a fragmentary perspective view of a part of the box;

Fig. 5 is a front view of the box; and

Fig. 6 is a sectional view on the line 6—6 of Fig. 3.

In accordance with the present invention the panelboard box 10 is preferably made of sheet steel as usual, and is ordinarily rectangular in shape. It is to be understood, however, that it is within the scope of the present invention to make a panelboard box of any suitable size and shape. Panelboard box 10 has a back wall 12, side walls 14 and 16, and end walls 18 and 20.

The panelboard box has a front opening 21 for access to the electrical devices mounted within it. Said box is also provided with a front member hereinafter described, which may be a trim member for the front of the box and which may also be provided with a door for closing the front of the box.

Pursuant to the present invention and for accomplishing the primary objects thereof, the panelboard box or cabinet 10 has a forward inwardly offset peripheral wall portion or rim 22 which preferably extends completely around the box and forms a recess 23 (Fig. 2) to receive plaster or other wall facing material P when the box is used in a flush mounting. Said wall portion 22 is integral with the peripherally extending shoulder 24 which is integral with and bent inwardly from side walls 14 and 16 and end walls 18 and 20.

A trim member 26 is provided for the front of the box and has an opening 28 for access to the panelboard or other electrical devices (not shown) which are mounted in the box, as will be readily understood. As here shown, a swinging door 30 hinged to member 26 as at 27 is provided for said access opening 28, but it will be understood that said door may be omitted when the box is used for certain types of panelboards. It will be noted that the peripheral edge 32 of member 26 is positioned laterally outwardly of rim 22 and as here shown preferably extends to and terminates at the planes of side walls 14 and 16 and end walls 18 and 20. Thus, said trim member has a marginal edge portion which overlaps the plaster or other wall facing material in recess 23, in the flush-mounted position of box 10, and conceals the edge of the facing material around rim 22. Also it will be observed that trim member 26 is of sufficient width around opening 28 to extend laterally inwardly of rim 22 to provide a trim portion around the panelboard in the box, as in the usual panelboard box, as will be readily apparent to those skilled in the art to which this invention relates. Member 26 is removably secured to the box preferably by screws 34 which pass through holes 35 and engage tapped members 36 (Fig. 4) welded or otherwise secured to the inner surface of rim 22. It will be understood that the box may be provided with openings or conventional knock-outs (not illustrated) for the passage of the electric wiring to and from the box.

A frame member 38 is provided for use on box 10 when the latter is to be employed in a surface mounting as illustrated, for example, by Fig. 3. Said frame member desirably fills recess 23 which would otherwise exist when the box is surface mounted. The frame 38 is formed in one piece and is preferably of such size that its inner edge 41 lies close to the outer surface of rim 22 and its outer edge 42 is flush with walls 14, 16, 18 and 20 of the box.

The removable intermediate frame 38 is constructed preferably of one piece of sheet metal of channel cross section, notched at intervals as indicated at 50 and bent to form an endless frame provided with an internal groove 40. The adjacent ends of the intermediate frame 38 are suitably secured together, for example, by means of splice plate 48 placed in the internal groove at the point where the adjacent ends meet, and spot welded to the frame as indicated at 44 and 46. Said frame interfits with the inwardly offset peripheral wall portion 22 forming a filler piece for the recess made by the peripherally extending shoulders 24, and the inwardly offset peripheral wall portion 22. The intermediate frame 38 need not be secured to the panelboard by screws or other fastening devices but is held in place automatically when the trim member is secured to the box. The trim member is secured to the panelboard box preferably by means of the screws 34 which pass through openings in said trim member and engage the tapped members or brackets 36 on the side walls of rim 22 of box 10.

Provision is made for holding frame member 38 releasably in place when the trim member 26 is removed. For this purpose a plurality of nibs or small projections 54 are pressed outwardly from the rim 22 in position to engage said frame as shown in Fig. 6. As indicated in Fig. 1, each side of rim 22 is provided with one of said nibs. It will be understood that while said nibs or projections serve to hold the frame member 38 in place so as to prevent accidental displacement of the frame member when the cover or trim member 26 is removed, said frame member can be easily removed or placed in position by the application of a small force thereto to clear said nibs.

The box 10 may be provided with any suitable means for securing the box in position. For example, holes 52 may be provided in the back wall of the box for fastening screws or other elements. Also, it will be understood that the box may be provided with knock-outs (not shown) for the wiring of the switches or other electrical devices which may be disposed within the box.

It will be observed that when, as shown in Fig. 2, the box is mounted in flush relation in a wall, frame 38 is not utilized and the box has a peripheral recess to receive the plaster or other wall facing material. When, as shown in Fig. 3, the box is surface mounted, the frame member 38 is disposed in the recess around rim 22 and is held in position automatically by the securement of cover 26 to the box, thus obviating the need for any other fastening means and facilitating the assembly of said frame member on the box.

It is to be understood that various changes in the detail of construction and modifications may be made without departing from the underlying idea of the present invention, within the scope of the appended claims.

Having thus described my invention, what I claim and desire to secure by Letters Patent, is:

1. In a panel box, the combination comprising a cabinet having a front opening, a peripheral side wall having an inwardly extending shoulder provided with an offset peripheral wall portion defining said front opening, a removable one-piece unitary frame interfitting with said offset wall portion around the latter externally thereof, said frame being U-shaped in cross section, one leg of said U-shaped frame being in abutment with said shoulder and the base of said U constituting a continuous peripheral wall flush with the outer surface of said side wall rearwardly of said shoulder, a trim member for the front of said cabinet, securing elements provided on the inner surface of said offset wall portion, releasable securing members interengaging said trim member and said securing elements for removably securing said trim member to said offset wall portion, the base of said U extending forwardly of said shoulder to said trim member, whereby said frame is held in position solely by said shoulder and said trim member when the latter is secured in position, and projections provided on the outer surface of said offset wall portion adjacent said shoulder for engagement by said one leg of said frame for holding said frame in place when said trim member is removed.

2. The combination defined in claim 1, further characterized in that said offset peripheral wall portion is in the form of a rectangle, said securing elements being provided on opposing sides of said rectangle and said projections being provided on all sides of said rectangle.

THOMAS M. COLE.

REFERENCES CITED

The following references are of record in the file of this patent:

UNITED STATES PATENTS

| Number | Name | Date |
| --- | --- | --- |
| 1,219,864 | Platt | Mar. 20, 1917 |
| 2,422,553 | Johansson et al. | June 17, 1947 |